United States Patent
Moor et al.

(10) Patent No.: US 8,946,642 B2
(45) Date of Patent: Feb. 3, 2015

(54) VERSATILE PET COINCIDENCE PROCESSOR

(71) Applicant: Siemens Medical Solutions USA, Inc., Malvern, PA (US)

(72) Inventors: Andrew Philip Moor, Knoxville, TN (US); William Scott Hood, Knoxville, TN (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 264 days.

(21) Appl. No.: 13/705,574

(22) Filed: Dec. 5, 2012

(65) Prior Publication Data

US 2014/0156970 A1     Jun. 5, 2014

(51) Int. Cl.
*G06F 15/76*     (2006.01)
*G01T 1/166*     (2006.01)

(52) U.S. Cl.
CPC ........................................ *G06F 15/76* (2013.01)
USPC ..................................... 250/363.04; 382/131

(58) Field of Classification Search
USPC ............... 250/362, 363.03, 363.04, 366, 394; 382/131
See application file for complete search history.

(56) References Cited

U.S. PATENT DOCUMENTS

| | | |
|---|---|---|
| 2010/0070808 A1 | 3/2010 | Casey et al. |
| 2010/0074498 A1 | 3/2010 | Breeding et al. |
| 2010/0078566 A1 | 4/2010 | Moor |

*Primary Examiner* — Mark R Gaworecki
(74) *Attorney, Agent, or Firm* — Peter Kendall

(57) ABSTRACT

A common or single type of positron emission tomography (PET) coincidence processor is useable with different PET systems. The ports are configurable to operate with different coincidence algorithms, allowing different numbers of ports to be used in different systems. The ports are configurable to provide different outputs and/or connect with different types of detectors. A programming port allows programming of an appropriate coincidence algorithm so that different such algorithms are usable by the controller. Any one or more of these accessible and/or versatile features are provided on a controller.

20 Claims, 3 Drawing Sheets

VERSATILE PET COINCIDENCE PROCESSOR

BACKGROUND

The present embodiments relate to a positron emission tomography (PET) coincidence processor. Blocks of detectors detect gamma rays emitted indirectly by a positron-emitting tracer. Using a ring of detectors, pairs of gamma rays generated by a same positron may be detected. The pairs of gamma rays travel about 180 degrees apart. To distinguish specific pairs, the coincidence of detected gamma rays is determined. The timing of receipt is used to pair the detected gamma rays. Using PET data from the detectors, the PET coincidence processor determines the detected events along lines of response.

There are different PET systems, each using different numbers of detectors. Example options include multi-modality systems. A combined computed tomography (CT) and PET system may use one number of PET detectors. A combined magnetic resonance (MR) and PET system may use a different number of detectors. Similarly, one PET system may use a different number of detectors than another PET system. Each type of PET system is programmed to operate with a coincidence algorithm specific to the number of detectors. The coincidence processor is designed specifically for the PET system. Given the specific design by type of system, accessibility and versatility of the coincidence processor is limited.

BRIEF SUMMARY

By way of introduction, the preferred embodiments described below include methods, systems, and controllers for PET coincidence processing. A common or single type of coincidence processor is useable with different PET systems. The ports are configurable to operate with different coincidence algorithms, allowing different numbers of ports to be used in different systems. The ports are configurable to provide different outputs and/or connect with different types of detectors. A programming port allows programming of an appropriate coincidence algorithm so that different such algorithms are usable by the controller. Any one or more of these accessible and/or versatile features are provided on a PET coincidence processor.

In a first aspect, a positron emission tomography (PET) coincidence processor is provided for different possible uses. A processor is within a housing. The processor is configurable for implementing a plurality of different PET coincidence algorithms. A plurality of ports is on the housing. The ports connect with the processor. A plug detector is configured to detect connection of PET data inputs to the ports. Different numbers of connections and corresponding different numbers of ports are usable for different coincidence algorithms in the same housing.

In a second aspect, a method is provided for programming a positron emission tomography (PET) coincidence processor. A plurality of ports is provided for receiving PET data. The ports are on the PET coincidence processor. Assignment of different ones of the ports to receive the PET data from at least two different types of detectors is arranged. One of the types of detectors is a radiation probe, and another one of the types of detectors is a detector of a PET system. PET coincidence processing is performed with the PET data from the at least two different types of detectors.

In a third aspect, a positron emission tomography (PET) coincidence processor is provided. A processor is configured for outputting coincidence events based on input PET data. A plurality of ports connects with the processor. The processor is configured to output the coincidence events on at least two of the ports. The coincidence events are mirrored or split on the at least two of the ports.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A PET coincidence processor architecture is provided for use with different PET systems. The same architecture is used with multi-modality systems and/or with different PET architectures. The ports, such as the fiber optic ports, and processor are configurable for coincidence processing with different numbers of detectors, different types of detectors, different event output formats, and/or different coincidence algorithms. The same component may be used in different environments, in different settings, and/or with different PET systems.

The coincidence processor is configured by the user for the appropriate situation. The "user" does not necessarily imply an operator, but may refer to manufacturing personnel, service personnel, advanced research customers, or an operator (e.g., technician or user at a medical facility). For example, the user connects the component with a PET system being assembled in a manufacturing facility and/or research environment. The PET coincidence processor is configured by the user for operation with the PET system. The same PET coincidence processor may be assembled and configured for operation with any of various PET systems, allowing for one type of component to be used in multiple systems.

Figure 1:
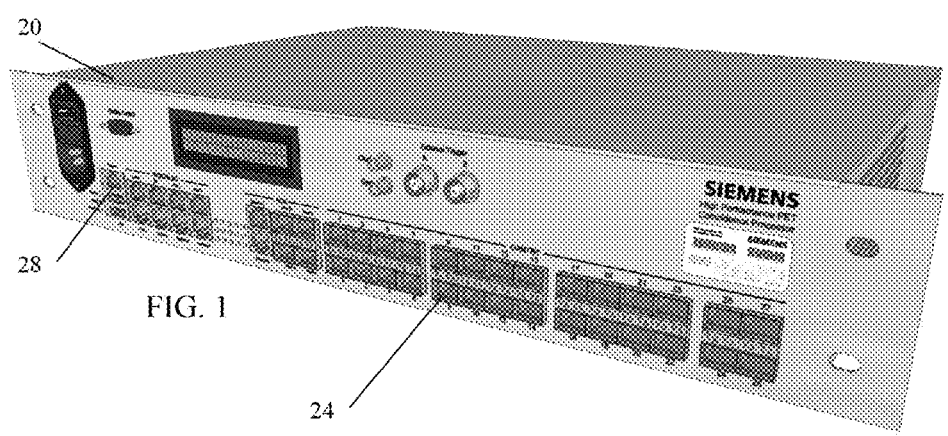
FIG. 1 is a perspective view of one embodiment of a PET coincidence processor.
Figure 2:
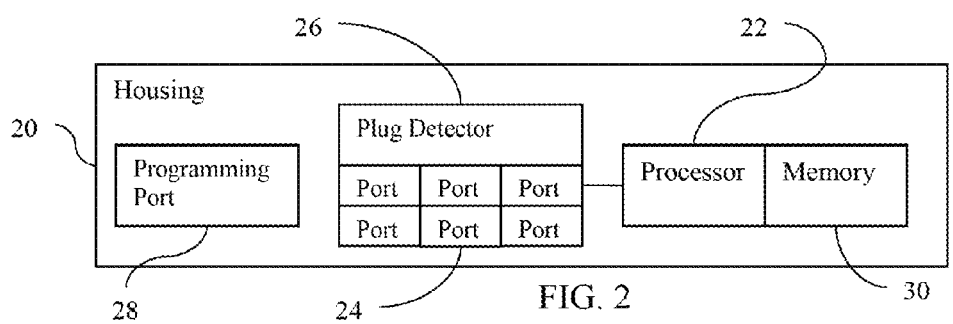
FIG. 2 is a block diagram of one embodiment of a PET coincidence processor with a first port arrangement.
Figure 3:
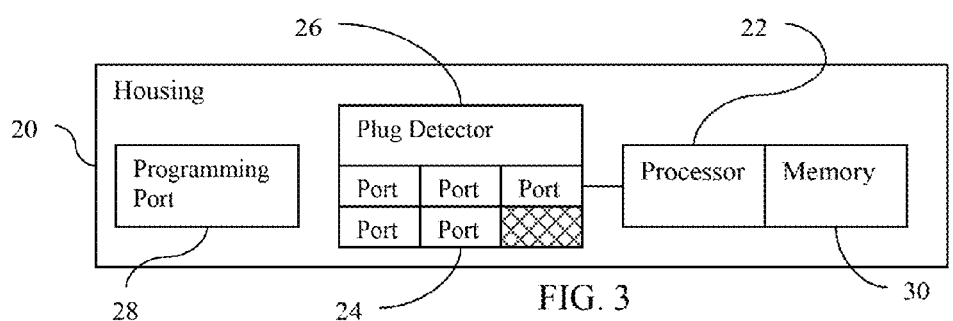
FIG. 3 is a block diagram of the PET coincidence processor of FIG. 2 with a second port arrangement.
Figure 4:
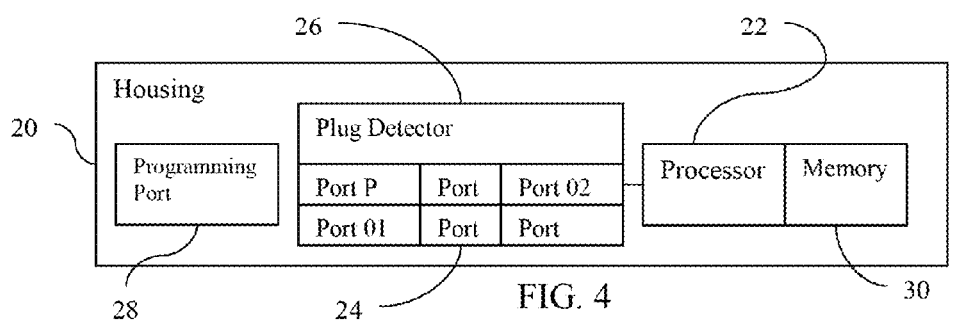
FIG. 4 is a block diagram of the PET coincidence processor of FIG. 2 with a third port arrangement.

FIG. 1 shows one embodiment of a positron emission tomography (PET) coincidence processor or component. The PET coincidence processor is configurable for different possible uses. The same controller may be used with different PET systems. The controller is operable with different outputs, different numbers of detectors, different types of detectors, and/or different coincidence algorithms. The PET coincidence processor, using hardware, software, or hardware and software, performs event discrimination or other coincidence processing appropriate for a given PET system once configured for that system. The same type of PET coincidence processor (e.g., same part number) may be configured and used in a different PET system. FIGS. 2-4 show three different arrangements for the PET coincidence processor of FIG. 1.

Referring to FIGS. 1-4, the PET coincidence processor includes a housing 20, a processor 22, a plurality of ports 24, a plug detector 26, a programming port 28, and a memory 30. Additional, different, or fewer components may be provided. For example, a programming port 28 and/or plug detector 26 are not provided or are implemented through configuration of one of the plurality of ports 24. As another example, additional ports for other purposes, such as gantry control, are provided. The components associated with dynamic assignment of the ports, programmability of the coincidence algorithm through a port, support for configurable output paths, and/or support for use with user-defined radiation probe (different types of detectors) may or may not be provided depending on which of these features is included in the versatile PET coincidence processor.

The housing 20 is metal, fiberglass, plastic, or other material. The housing 20 encloses the processor 22 and/or memory 30, such as enclosing one or more circuit boards and associated components. A rectangular or cubical shaped housing with six sides covered by the housing material is used. The housing 20 may include openings, such as for the ports 24, 28, power, other connectors, vents, fans, switches, and/or displays. In other embodiments, additional openings, a whole side being open, and/or other shapes are used.

In one embodiment, the housing 20 is rack mountable. One or more flanges, extensions, holes, grooves, clips, receptacles, or other mounting structure are provided in or on the housing 20. FIG. 1 shows a rack mount housing 20. For example, the housing 20 is rack-mountable in an industry-standard 19" equipment rack, but may also be vertically mounted for PET systems where the housing 20 is included within the cosmetic covers of the PET scanner.

The processor 22 is within the housing 20. For example, the processor 22 is mounted to a circuit board housed in the housing 20. In other embodiments, the processor 22 is on or connected with the housing 20.

The processor 22 is a general processor, central processing unit, control processor, graphics processor, digital signal processor, application specific integrated circuit, field programmable gate array, digital circuit, analog circuit, combinations thereof, or other now known or later developed device for coincidence processing. The processor 22 is a single device or multiple devices operating in serial, parallel, or separately. The processor 22 is specifically designed or provided for coincidence processing, but may be a main or general processor of a computer, such as a laptop or desktop computer, or may be a processor for handling tasks in a larger system, such as the PET system. The processor 22 may perform other functions than coincidence processing.

The processor 22 is configurable. The processor 22 is configured by software and/or hardware. For example, switches, such as dip switches, are set. Potentiometers, resistances, capacitances, inductances, or other devices may be selectable or set. As another example, different software, firmware, and/or instructions are loaded or stored in memory for configuring the processor 22.

The processor 22 is configurable for implementing different PET coincidence algorithms. Coincidence algorithms are designed to operate in particular ways, based at least in part on the hardware or detector configuration. One algorithm may be used with twenty four blocks of detectors in one type of PET system, and another algorithm may be used with twenty eight blocks of detectors in another type of PET system. Different algorithms may be provided for different types of outputs. Different algorithms may be provided for different types of detectors. Detectors may be photo multiplier tubes or silicon avalanche photodiodes. Detectors may be arranged in rings in a PET system for one type and on an accessory or handheld probe for another type.

The processor 22 is configured for implementing only one coincidence algorithm. The processor 22 is capable of implementing other algorithms. The capability of implementing different algorithms allows the same type of controller to be used in different PET systems. The processor 22, alternatively, is configured for implementing different algorithms at different times.

For implementing the coincidence algorithm, the processor 22 is configured to detect PET events. PET input data from the detectors includes energy and timing information. The energy and timing information is used to determine coincidence of detection by different detectors. Pairs of gamma rays associated with a same positron emission are determined. Based on the detected event, a line of response is determined based on the detectors involved in the detection of that event. The processor 22 uses the coincidence algorithm, detector position, and timing to detect events.

To determine the line of response or detected event, the processor 22 is configured with a port assignment. The ports 24 are assigned to specific data inputs. Different detector blocks are mapped to different ports 24. The configuration of the processor 22 includes port assignments. The port assignments may include more than just detector inputs from the PET system. For example, one or more ports 24 are assigned to be connected with accessories, such as a handheld gamma or radiation detection probe. As another example, one or more ports 24 are assigned to output operation. Depending on the coincidence algorithm or other user selection, different outputs are provided.

The processor 22 outputs the detected PET events. The PET events may be output as coincidence pairs. Alternatively or additionally, the line of response, timing, amplitude, and/or other information is output. The detected PET events are output as a stream of data. As the events are detected, the events are output. Alternatively, the stream of data is output from the memory 30.

In one embodiment, the processor 22 is configurable to provide different output arrangements. One possible output arrangement is of the stream of detected events on a single channel. The stream is output on one port 24 or a different dedicated port. Another possible output arrangement is that the stream of detected events is output on multiple channels. The ports 24 or dedicated port and configurable port 24 used is configured by the user and/or as part of the coincidence algorithm. In one embodiment, a group of ports other than the fiber optic configurable ports 24 is provided for configurable output. Two of the ports may be used to output on different channels.

Using two or more outputs allows for mirroring or splitting the event data. For example, the same event data is output on multiple channels. The original event data is output on a dedicated port or a configured port 24. A copy is output on a configured port 24 or another assigned port. The redundant output may be used for research, debugging, or alternative tomography systems.

As another example, the event data is divided between multiple outputs. Different events are output on different output channels, such as ever other or other grouping of events per channel. The event stream is separated into two or more parallel channels. Any criteria may be used for separation, such as different channels for different parallel coincidence processes, separation based on type of event (e.g., amplitude, timing, possible singles, multiple detections by a same detector in a period associated with an event, or other division), separation based on timing, separation based on bandwidth, or other division. By splitting the output, the coincidence processor may be able to handle larger volumes or greater bandwidth of coincidence data (e.g., detected events and/or data associated with detected events).

The processor 22 is configurable to operate with different types of detectors. For example, the coincidence algorithm is designed to operate with a combination of a handheld radiation probe and a ring of detectors of a PET system. The radiation probe may be connected with a configurable port 24, so the processor 22 is configured to receive the probe data from a specific port and perform event detection appropriate for the probe data. The configuration of the processor 22 supports user-defined radiation probe accessories. For example, advanced researchers may develop custom radiation probes, which feed data directly into the coincidence processing fabric of the coincidence processor. Since the processor 22 implements the coincidence processing fabric, the processor 22 being configurable with an appropriate coincidence algorithm allows the researchers to use the controller for experimental or other arrangements.

The ports 24 are fiber optic ports. Any physical form may be used, such as ports for accepting standard optical fiber connectors. Push and click, bayonet, threaded, or other mating connection may be used. The ports may be male or female connectors. The fiber optic ports may include a transceiver or receiver for converting light signals into electrical signals. In alternative embodiments, the ports 24 are coaxial cable or other communications terminals.

Any number of ports 24 may be provided. In one embodiment, at least twenty, twenty four, or twenty eight ports 24 are provided. Different numbers of ports 24 may be used for different configurations, PET systems, and/or coincidence algorithms as long as the number is at or below the number of available ports 24.

The ports 24 connect with the processor 22. Wires, circuit board traces, or other connections provide communication from or to the ports 24. The connection is directed or indirect. For example, a multiplexer connects different pins of the processor 22 to different ports 24. The multiplexer is configured by the processor 22, configured separately, or otherwise configured to connect specific ports 24 to specific pins of the processor 22 for a given configuration and/or coincidence algorithm. A given coincidence algorithm is operable with a given number of the ports 24 connected to receive PET data. Specific ports 24 and corresponding detectors are assigned to specific pins or other inputs to the processor 22.

The ports 24 are configurable. Using the multiplexer, different ports 24 are assigned different functions and/or connection with different devices. Other configuration of the ports 24 may be used, such as providing different labeling or headers for using a shared bus for multiple ports 24. The communications differentiate the port 24 from which data is received. Software assignment or a look-up table configures the ports 24. Different ports 24 are assigned for different connections. The processor 22 may be configured to associate different pins with different connections for the ports 24, such as where each port 24 has a fixed pin connection but the processor 22 is configurable to use a given pin in different ways (e.g., one pin used for output, input with one type of detector, or input with another type of detector).

In one embodiment, one or more (e.g., all) of the ports 24 are configurable for connection with different types of PET detectors. For example, a given port 24 may be configured for connection with detectors of a PET system and a radiation probe. In a given configuration, the port 24 is configured to be connected with one type. Other ports 24 are configured for connection with others of the same type or with different types of detectors.

Other connectors than the ports 24 and 28 may be provided. In one embodiment, Ethernet, RS-232, CAN, digital, analog, and/or other connectors are provided. The processor 22 supports a variety of system I/O. For example, a power plug or connector is provided. As another example, an Ethernet, universal serial bus (USB) or other connector enables communications with a CT scanner or MRI scanner or for command and control operations. Digital inputs and outputs may enable transfer of gating signals, patient table position, system status, time synchronization, and other information. Connectors may be provided to support external devices, such as respiratory and ECG monitors, research triggers, and similar equipment. Connectors for controlling a PET gantry may be provided. Connectors for the acquisition computer system (ACS) may be provided, such as connectors for outputting event data to a server or computer for generating images and/or data storage. Rather than configuring the ports 24 for different number of outputs, other ports (e.g., ACS ports) may be configured for a different number of outputs.

Other devices may be provided on the housing 20. For example, one or more light emitting diode indicators are provided. As another example, an alphanumeric message display is provided.

The plug detector 26 detects connection of a cable, transceiver, detector, probe, or other device with the ports 24. While one plug detector 26 is shown for all the ports 24, separate plug detectors 26 may be provided for each or for sub-groups of the ports 24. In alternative embodiments, the plug detector 26 is not provided.

The plug detector 26 is implemented as a physical detector or a communications detector. Hardware and/or software implementation may be provided. For example, the placement of a connector into or against the port 24 is detected. As another example, data and/or signals being provided through the port 24 is detected. The processor 22 may implement the plug detector 26 where communications alone are used. Alternatively, a separate device detects the communications.

The plug detector 26 detects connection in general. Alternatively, the plug detector 26 detects the type of connection. For example, the plug detector 26 may distinguish based on physical connection and/or communication between different devices. Different detectors may have different identifiers communicated to the plug detector 26. The plug detector 26 may distinguish between types of connected devices without distinguishing between specific ones of the devices.

The plug detector 26 confirms connections that correspond with a configuration. Where the connections do not conform to the configuration expected for a particular use of the controller, an error message may be generated.

In alternative embodiments, the plug detector 26 detects the connections and the detected connections are used to configure the processor 22 and ports 24. For example, connection of twenty four ports 24 to detectors of a PET system and no connection to other detectors indicates a particular coincidence algorithm to use. The particular algorithm is loaded or selected and used to configure the processor 22. Alternatively, the user selects the coincidence algorithm using the programming port 28, and the plug detector 26 confirms appropriate connections. In yet other alternatives, the PET system or other communications are used to provide the desired coincidence algorithm.

The ports 24 are useable for different coincidence algorithms. The ports 24 of the same housing are useable in different systems. The coincidence algorithm is designed for use with a specific arrangement of detectors. Different coincidence algorithms are designed for use with different arrangements of detectors and/or other I/O. By providing configurable ports 24, the different numbers of connections and corresponding different ports 24 of a same housing or component may be used with different coincidence algorithms and corresponding PET systems.

FIGS. 2-4 show examples of a same component being useable with different PET systems. Since the component is typically configured during manufacture or installation, a given component is likely to be used in only one configuration. This given component, however, has the capability of having been used in any of multiple PET systems due to the dynamic configuration capabilities.

FIG. 2 shows an example where all of the ports 24 are connected with detectors in a ring of a PET system. For example, twenty-eight ports 24 connect with twenty-eight blocks of detectors. Certain ports 24 are assigned to connect with certain detectors so that the port assignment distinguishes the physical location of detectors.

FIG. 3 shows an example where less than all of the ports 24 are connected with detectors in a ring of the PET system. For example, the PET system has only twenty four detector blocks. Only twenty four ports 24 are connected with PET detectors. One or more (e.g., four) ports 24 are not connected to any device external to the housing 20. In FIG. 3, the lack of connections is represented by the port 24 with cross hatching.

FIG. 4 shows an example where some ports 24 connect with PET detectors, but other ports 24 are configured for other connections. The other connections include one (Port P) with a handheld radiation probe and two ports (Port 01 and Port 02) used for two channels of output. In other embodiments, the configurable number of output channels uses other ports, such as a separate bank of optical fiber, RS-232, or other types of ports.

As shown in the examples of FIGS. 2-4, the controller is operable with different PET systems having different numbers of radiation detectors and corresponding number of ports 24. The configurable ports 24 and processor 22 allow for the same component to be used with any of multiple different PET systems.

The coincidence algorithm to be used for a given configuration assigns the ports 24. Connected ports 24 are labeled in memory 30 for the processor 22. The labeling is in a look-up table, configuration file, or integrated within the coincidence algorithm. Using any resource, the coincidence algorithm assigns the ports 24 so that data from a given port 24 is associated with a particular source. In one embodiment, the source (e.g., PET detector block) may be plugged into any port 24. Communications or user input are used to identify which source is connected with which port 24. Alternatively, specific sources are plugged into specific ports 24.

The PET data inputs are user-scalable. The population of fiber optic transceivers used for PET data I/O may be readily changed to suit the particular needs of a given system. Having one component configurable for different PET systems may provide a cost advantage and/or improved serviceability. Rather than designing a specific PET coincidence processor with a set number of ports and coincidence algorithm for each PET system, the same component may, off the shelf, be used for assembling any or multiple PET systems. The component is configured dynamically using software, connections, and/or input rather than hardware design. This may avoid costs associated with creating separate components for each system. The configurable component preserves high-performance options (e.g., number of input ports 24 and output channels) while being usable with smaller-scale systems (e.g., fewer number of ports 24 and/or output channels).

In one embodiment, a programming port 28 separate from the configurable ports 24 is provided. The programming port 28 is a Joint Test Action Group (JTAG) connector. Alternatively, Ethernet or other connectors are used. The programming port 28 connects with the memory 30. The connection is direct or indirect. For example, the programming port 28 connects with the processor 22. The processor 22 routes data to be stored to the memory 30.

The programming port 28 provides for inputting configuration information and/or outputting confirmation information. The coincidence algorithm, including port assignments, is input through the programming port 28. For example, a manufacturer determines that a specific PET system is to be assembled. The coincidence algorithm, including the port configuration, is loaded into the controller through the programming port 28. Rather than relying on loading from PET system communications once assembly is complete, the configuration is added while access to the controller is more convenient, prior to assembly with the PET system, or prior to powering on the assembled PET system. The programming port 28 may be used after assembling and/or powering on the PET system.

The user-accessible programming port 28 may simplify manufacturing testing and engineering debugging. The programming port 28 may provide a mechanism for suitably authorized and trained advanced research customers to deploy customized coincidence processing algorithms. For example, systems for PET detection using handheld probes are tested. The programming port 28 facilitates deployment and integration of probes by allowing changes to or replacement of the coincidence algorithm.

In other embodiments, more than one coincidence algorithm is loaded. Other configuration information or detection of specific port usage is used to select the coincidence algorithm to be used.

Alternatively, the configuration and/or coincidence algorithm to be used is loaded through PET system communications. Rather than a dedicated programming port 28, an Ethernet, USB or other communications port is used for configuring.

The memory 30 is a random access memory, graphics processing memory, video random access memory, system memory, cache memory, hard drive, optical media, magnetic media, flash drive, buffer, database, combinations thereof, or other now known or later developed memory device for storing data. The memory 30 is within the housing 20, connects with the controller or is otherwise part of the controller.

The memory 30 stores PET input data, such as energy and position signals from PET detector blocks. The memory 30 stores data as processed, such as storing detected events, line of response, or other data. The event data for output may be stored or provided directly to the output without storage. Alternatively, a separate or different memory is used for PET input data and/or detected events.

The memory 30 stores port assignments. The sources connected with each of the configurable ports 24 are stored. The assignments are stored as part of the coincidence algorithms or in a separate storage. The port assignments corresponding to a loaded coincidence algorithm or to a coincidence algorithm to be loaded are stored. Instead, the assignments may be detected by the plug detector 26 and stored based on the detection. In alternative embodiments, multiple possible assignments are stored. Based on the detected connections and/or loaded coincidence algorithm, the appropriate assignments are selected.

The memory 30 stores one or more coincidence algorithms. The instructions, variables, values, and/or other information making up and/or used by the coincidence algorithm are stored. When implemented by the processor 22, the instructions are loaded from the memory 30. Values or other information, such as the port assignments, may be accessed from the memory 30 by the processor 22. Where more than one coincidence algorithm is stored in the memory 30, one of the algorithms may be selected to configure the processor 22 for use with a specific PET system and/or port configuration.

The memory 30 or other memory is a non-transitory computer readable storage medium storing data representing instructions executable by the programmed processor 22 for configuring and/or implementing coincidence processing. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

Figure 5:
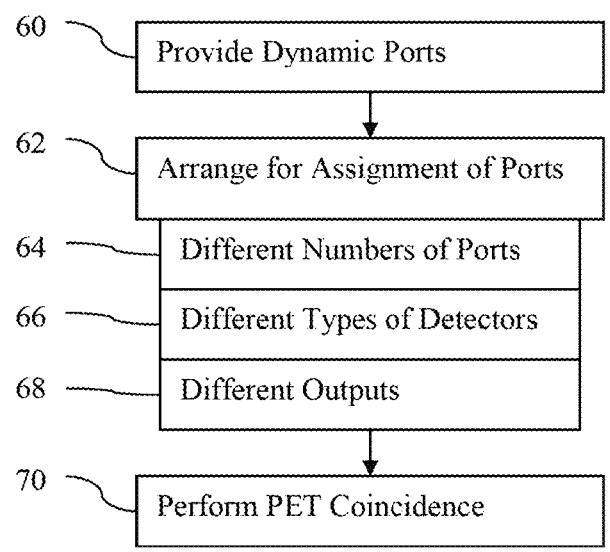
FIG. 5 is a flow chart diagram of one embodiment of a method for programming a PET coincidence processor.

FIG. 5 shows one embodiment of a method for programming a positron emission tomography (PET) coincidence processor. The method is implemented using the controller of FIG. 1, FIGS. 2-4, or other controller. The method is performed in the order shown, but other orders may be used. For example, arranging for the different options in acts 64-68 may be performed in any order. Additional, different, or fewer acts may be provided. For example, any one, any two, or all three of the acts 64, 66, 68 are performed with or without the others.

In act 60, a plurality of ports is provided for receiving PET data. The ports are dynamic in the sense that any given port may be assigned or not for use with a given PET system. One or more of the ports may not be used. Alternatively, all of the ports may be used. If used, the ports connect with separate detectors. Separate fiber optic cables for each PET detector block carry the signals from the PET detector block to the detector circuit through the port.

The ports are configurable or dynamic in the sense of, if used, different detectors may be connected. Rather than dedicating each port to a specifically positioned detector, the ports may be connected with any detector and configuration used to associate each port with specific sources or source positions. In alternative embodiments, the ports, if used, are dedicated to specific sources or source positions.

In act 62, the assignment of different ports to receive PET data is arranged. The assignment is arranged by configuration. The coincidence algorithm may be loaded where the algorithm is associated with specific assignment. A look-up table may be loaded. Alternatively, the sources connected to the ports and/or which ports are even connected are detected and used to create assignments.

Different types of assignments may be used. In act 64, different numbers of ports are assigned. One or more ports may not be used for a given configuration. The assignment accounts for this by only assigning used ports or by assigning unused ports to a default or unused setting. Alternatively, the coincidence algorithm does not call for data from unused ports.

In act 66, different types of detectors may be assigned. The type of source detector is assigned. Types of detectors include different types of detector blocks, detector technology (e.g., photomultiplier tube verses photodiode), different crystals, different detector arrangement, and/or differences in structure. For example, one or more ports may be connected to handheld, robot mounted, or other radiation probes. Other ports are connected to positionally fixed detectors arranged in a ring of a PET system.

In act 68, different use of the ports are arranged. One or more ports may be used for output rather than input. The number of ports and which ports to be used for output are assigned. The output ports may output the same data (e.g., mirrored) or may output different data (e.g., split output).

Other configuration may occur. For example, a coincidence algorithm is received through a programming port separate from the configurable ports. The programming port is dedicated to configuring the controller. Alternatively, the programming port may have other uses as well.

The coincidence algorithm defines the assignments of the ports. Alternatively, the ports are configured based on the coincidence algorithm. The definition may be of the number of ports for particular uses, such as twenty four ports for PET input, no extra ports for event output, and no or one port for connection with a radiation detection probe. The configurable or fiber optic ports are dynamically configured based on the PET system being created and the corresponding coincidence algorithm. The user, such as a manufacturer, researcher, or maintenance person, may configure the port assignments and/or coincidence algorithm.

In act 70, the configured PET coincidence processor is used. The PET system with the corresponding coincidence processor detects events. PET data from detectors, such as a ring or rings of detectors, are received. In response to an emission of a pair of gamma rays (photons), arrays of crystals contacted by the gamma rays generate light. The detectors, in response to the light, generate signals. The signals are processed, such as summed and converted to digital data. The digital data is transmitted as light over fiber optical cables to the coincidence processor.

The relative position of the different detectors, based on the ports connected to the detectors, is used to detect events. The received PET data is processed to identify positron emission events or from a same radiation decay event.

Where different types of detectors are used, the coincidence processing may be different. Using the configured port assignments, the source of the PET data is known. The PET data is processed accordingly.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A positron emission tomography (PET) coincidence processor for different possible uses, the PET coincidence processor comprising:
   a housing;
   a processor within the housing, the processor configurable for implementing a plurality of different PET coincidence algorithms;
   a plurality of ports on the housing, the ports connected with the processor; and
   a plug detector configured to detect connection of PET data inputs to the ports;
   wherein different numbers of connections and corresponding different numbers of ports are usable for different coincidence algorithms in the same housing.

2. The PET coincidence processor of claim 1 wherein the housing comprises a rack mountable housing.

3. The PET coincidence processor of claim 1 wherein the processor comprises a PET coincidence processor configurable to detect PET events.

4. The PET coincidence processor of claim 1 wherein the ports comprise fiber optic ports.

5. The PET coincidence processor of claim 1 wherein the plurality comprises at least twenty four ports, the controller operable with different PET systems having different numbers of radiation detectors using a corresponding different number of the ports.

6. The PET coincidence processor of claim 1 wherein the plug detector is operable to detect a presence of connectors within the ports.

7. The PET coincidence processor of claim 1 wherein the plug detector is operable to detect as a function of data communication.

8. The PET coincidence processor of claim 1 wherein the ports and processor are configurable for operation with different PET systems.

9. The PET coincidence processor of claim 1 further comprising:
   a programming port separate from the plurality of ports, the programming port connected with a memory for storing a first coincidence algorithm of the different coincidence algorithms input through the programming port, the first coincidence algorithm assigning the ports connected and not assigning unconnected ports.

10. The PET coincidence processor of claim 1 wherein the processor is configured using any of the different coincidence algorithms to output a stream of events based on PET data from the PET data inputs, the processor further configured to output the events in redundant channels through at least two of the ports.

11. The PET coincidence processor of claim 1 wherein the processor is configured using any of the different coincidence algorithms to output a stream of events based on PET data from the PET data inputs, the processor further configured to output the events separated into at least two channels through a respective at least two of the ports.

12. The PET coincidence processor of claim 1 wherein the processor is configured by a first coincidence algorithm of the different coincidence algorithms to operate with a radiation probe connected with a first port of the plurality of the ports.

13. The PET coincidence processor of claim 1 further comprising:
   a memory storing a first coincidence algorithm of the different coincidence algorithms and storing port assignments for the ports based on the first coincidence algorithm, the first coincidence algorithm operable with a first number of the ports connected to receive PET data.

14. A method for programming a positron emission tomography (PET) coincidence processor, the method comprising:
   providing a plurality of ports for receiving PET data, the ports being on the PET coincidence processor;
   arranging for assignment of different ones of the ports to receive the PET data from at least two different types of detectors, one of the types of detectors comprising a radiation probe and another one of the types of detectors comprising a detector of a PET system; and
   performing PET coincidence processing with the PET data from the at least two different types of detectors.

15. The method of claim 14 wherein arranging comprises receiving a coincidence algorithm through a programming port separate from the ports of the plurality, the coincidence algorithm defining the assignment of the ports to the radiation probe and the detector of the PET system.

16. The method of claim 14 wherein arranging comprises allowing for user configuration of the ports.

17. A positron emission tomography (PET) coincidence processor comprising:
   a processor configured for outputting coincidence events based on input PET data; and
   a plurality of ports connected with the processor;
   wherein the processor configured to output the coincidence events on at least two of the ports, the coincidence events output as mirrored or split on the at least two of the ports.

18. The PET coincidence processor of claim 17 wherein the processor is configured to output the coincidence events on a first of the ports and a copy on the second of the ports.

19. The PET coincidence processor of claim 17 wherein the processor is configured to output the coincidence events with the coincidence events divided between a first and a second of the ports.

20. The PET coincidence processor of claim 17 wherein the ports are connectable with detectors of a PET system and a radiation probe, and wherein the processor is configurable to assign the ports between the detectors of the PET system, the radiation probe, and the output differently for different coincidence algorithms.

* * * * *